(12) United States Patent
Tajima et al.

(10) Patent No.: US 6,488,789 B2
(45) Date of Patent: Dec. 3, 2002

(54) WHEEL BEARING UNIT

(75) Inventors: Eiji Tajima, Shizuoka-ken (JP); Motoharu Niki, Osaka-fu (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/760,706

(22) Filed: Jan. 17, 2001

(65) Prior Publication Data

US 2001/0015241 A1 Aug. 23, 2001

(30) Foreign Application Priority Data

Jan. 18, 2000 (JP) ........................................ 2000-009216

(51) Int. Cl.$^7$ ........................... C22C 38/00; C22C 38/18
(52) U.S. Cl. ........................ 148/333; 148/320; 148/906; 148/318; 148/319; 384/492; 384/912
(58) Field of Search ................................. 148/906, 318, 148/319, 333, 320; 384/492, 912

(56) References Cited

U.S. PATENT DOCUMENTS 6,224,266 B1 * 5/2001 Ohtsuki et al. ............. 384/571
6,224,688 B1 * 5/2001 Takemura et al. .......... 148/906

* cited by examiner

Primary Examiner—Deborah Yee
(74) Attorney, Agent, or Firm—Arent Fox Kintner Plotkin & Kahn, PLLC

(57) ABSTRACT

A wheel bearing unit is provided in which the service life level is improved without making the size and weight of the bearing unduly large. The wheel bearing unit for rotatably supporting a car wheel on the body of a motor vehicle comprises a rotary member, an outer ring, and double rows of rolling elements. The rotary member comprises a hub wheel to which a car wheel is attached and an inner ring press-fitted to the outer circumference of the smaller end face of the hub wheel, wherein double rows of raceway surfaces are formed in the outer circumferential surfaces of the hub wheel and the inner ring, respectively. The outer ring has double rows of raceway surfaces formed therein so as to be opposite to the raceway surfaces of the hub wheel and the inner ring, and is fixedly coupled to a car-body-side knuckle. The double rows of rolling elements are interposed between the raceway surfaces of the hub wheel, the inner ring, and the outer ring. In this construction, at least the hub wheel and the inner ring are each made of a carbon steel containing 0.60 to 0.80 wt % of carbon, and a surface hardened layer is formed in the predetermined area thereof by a high-frequency quenching technique.

4 Claims, 4 Drawing Sheets

WHEEL BEARING UNIT

BACKGROUND OF THE INVENTION

1. Field of the Invention

The present invention generally relates to a wheel bearing unit, and more particularly to a long-Life wheel bearing unit for rotatably supporting a car wheel on the body of a motor vehicle.

2. Description of the Prior Art

FIG. 1 is a diagram of a wheel bearing unit for use with a motor vehicle, illustrating an example of a construction designed for use in a driving wheel. This wheel bearing unit is composed of a hub wheel 1, an outer joint member 3 of a constant velocity universal joint 2, and an axle bearing 4 that are assembled into a unit. Note that the outer joint member 3 of the constant velocity universal joint 2 is, with an axially extending stem portion 5 inserted through a through hole 6 of the hub wheel 1 and serrations 7 and 8 formed in the outer circumference of the stem portion 5 and the inner circumference of the through hole 6, respectively, coupled to the hub wheel 1 and secured with a nut 9 so as to achieve torque transmission therebetween.

The constant velocity universal joint 2 is composed of, in addition to the outer joint member 3, an inner joint member 11 attached to the edge of a shaft 10, a plurality of torque transmission balls 12 incorporated into the track grooves of the inner and outer joint members 11 and 3, and a retainer 13 interposed between the outer spherical surface of the inner joint member 11 and the inner spherical surface of the outer joint member 3 for retaining the torque transmission balls 12.

The wheel bearing unit is so constructed that the hub wheel 1 is rotatably supported on the axle bearing 4. A vehicle wheel (not shown) is fixedly attached to the hub wheel 1, and the axle bearing 4 is supported through a knuckle 14 on a suspension system (not shown) of the car body.

The axle bearing 4 employs a double row angular ball bearing structure. In this construction, an outer ring 15 has double rows of raceway surfaces 16 and 17 formed in its inner diameter surface. One raceway surfaces 18 is formed in the outer circumferential surface of the hub wheel 1, and the other 19 is formed in the outer circumferential surface of an inner ring 20 that is press-fitted to the outer circumference of the edge of the hub wheel 1. These raceway surfaces 18 and 19 are opposite to the raceway surfaces 16 and 17 of the outer ring 15, respectively. Between the raceway surfaces of the outer ring 15, and the hub wheel 1, the inner ring 20 are interposed double rows of rolling elements 21 and 22. The rolling elements 21 and 22 are held at circumferentially equally-spaced positions in the retainers 24 and 23, respectively.

The outer ring 15 has a body mounting flange 25 protrudingly formed in its outer circumference. The flange 25 has, in several positions around its surface, female threads 26. By screwing a bolt 27 on the female threads 26, the outer ring 15 is fixedly attached to the knuckle 14. Note that the axle bearing 4 is provided with a seal 28, for preventing accidental intrusion of foreign material from outside or leak of grease contained inside.

The hub wheel 1 is provided with a wheel mounting flange 29. The flange 29 has a hub bolt 30 attached at circumferentially equi-spaced positions thereof for fixing a vehicle wheel. Moreover, a brake rotor 31 is fixedly attached to the flange 29 with the hub bolt 30.

Incidentally, in conventional wheel bearing units, the hub wheel 1 and the outer ring 15 are commonly made of a medium carbon steel which raceways are induction hardened. Specifically, steel materials ranging from S40C steel to S58C steel (as defined in the Japanese Industrial Standard (JIS) G 4051), in particular, S53C steel (a medium carbon steel) is employed.

The reason why the S53C steel (a medium carbon steel) is employed as an exemplary steel material for the hub wheel 1 and the outer ring 15 is as follows. If the hub wheel 1 and the outer ring 15 are sized and shaped based on a plastic working technique, in the case where, if a high carbon steel is used, for example, SUJ2 steel that is defined as a high carbon chromium steel for bearing structural use in JIS G 4805, it is inevitable that the forgeability is markedly deteriorated.

However, the use of S53C steel cannot be said to be highly advantageous in terms of a service life level, as compared with the rotating fatigue life of SUJ2 steel. In particular, the inner-board and outer-board raceway surfaces formed in the outer diameter surfaces of the hub wheel 1 and the inner ring 20, and the inner diameter surface of the outer ring 15, respectively, tend to suffer from a comparatively short service life. To prevent the service life from being shortened, the bearing is designed to have a larger rated load capacity so as to maintain the service life at adequate levels. This, however, cannot be achieved without making the size and weight of the bearing unduly large.

SUMMARY OF THE INVENTION

An object of the present invention is to provide a wheel bearing unit in which the service life level is successfully improved without making the size and weight of the bearing unduly large. To achieve the above object, according to one aspect of the present invention, a wheel bearing unit for rotatably supporting a wheel on the body of a motor vehicle is provided with a rotary member, a fixed member, and double rows of rolling elements. The rotary member to which a wheel is attached has double rows of raceway surfaces formed therein. The fixed member is fixedly coupled to a mounting member located on the car-body side of the device, and has double rows of raceway surfaces formed therein so as to be opposite to the raceway surfaces of the rotary member. The double rows of rolling elements are interposed between the raceway surfaces of the rotary and fixed members, respectively. In this construction, at least the rotary member is made of a carbon steel containing 0.60 to 0.80 wt % of carbon, and, in a predetermined area thereof, a surface hardened layer is formed by a high-frequency quenching technique.

In the wheel bearing unit embodying the present invention, by forming at least the rotary member from a carbon steel containing 0.60 to 0.80 wt % of carbon, it is possible to obtain satisfactory processability (forgeability). This is because the amount of carbon contained in this carbon steel is smaller than that contained in SUJ2 steel, which is defined as a high carbon chromium bearing steel in JIS G 4805 (C: 0.95 to 1.10 wt %). Moreover, by forming a surface hardened layer in a predetermined area thereof by a high-frequency quenching technique, it is possible to suppress degradation of the hardness of the steel and thus secure sufficiently long rolling fatigue life. This makes it possible to improve the service life level without making the size and weight of the bearing unduly large.

The rotary member is made of steel containing: C: 0.70 to 0.80 wt % (exclusive of 0.80), Si: 0.50 to 1.0 wt %, Mn: 0.10 to 2.0 wt %, Cr: 0.40 to 0.95 wt %, Al: 0.050 wt % or less, 0: 0.0030 wt % or less, and the remainder being Fe and inevitable impurities. The use of such a steel material helps achieve further improvement of the processability and the rolling fatigue life. Moreover, of the double rows of raceway surfaces of the rotary member, the inboard raceway surface is formed in an inner ring that is separately provided. The inner ring is made of an alloyed steel containing: C: 0.8 to 1.2 wt %, Si: 0.4 to 1.0 wt %, Cr: 0.2 to 1.2 wt %, and Mn: 0.8 to 1.5 wt %. The inner ring is, after undergoing carbo-nitriding treatment, quenched at temperatures in the range of 830 to 870° C., and subsequently tempered at temperatures in the range of 160 to 190° C., with the residual austenite content in the surface layer part being 25 to 50 vol.%.

Furthermore, the inboard raceway surface is formed in a separately provided inner ring that is made of a carburized steel containing 0.15 to 0.40 wt % of carbon. The raceway surface is composed of a surface hardened layer that contains carbon in the amount of 0.8 wt % or more and has Rockwell hardness of HRC 58 or more, and a core part that has Rockwell hardness of HRC 48 or more and below HRC 58. In the surface hardened layer, the residual austenite content is kept in the range of 25 to 35 vol. %, the grain size of the residual austenite is kept at 5 μm or less, and residual carbide content is kept at 10% by area or less.

Of the double rows of raceway surfaces of the rotary member, the inboard raceway surface tends to suffer from a comparatively short service life. In view of this fact, the separately provided inner ring in which the inboard raceway surface is formed is made of a steel material having the above-described composition, and is subjected to the above-described heating treatment. By doing so, the rolling fatigue life can be further improved.

The nature, principle, and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Figure 2:
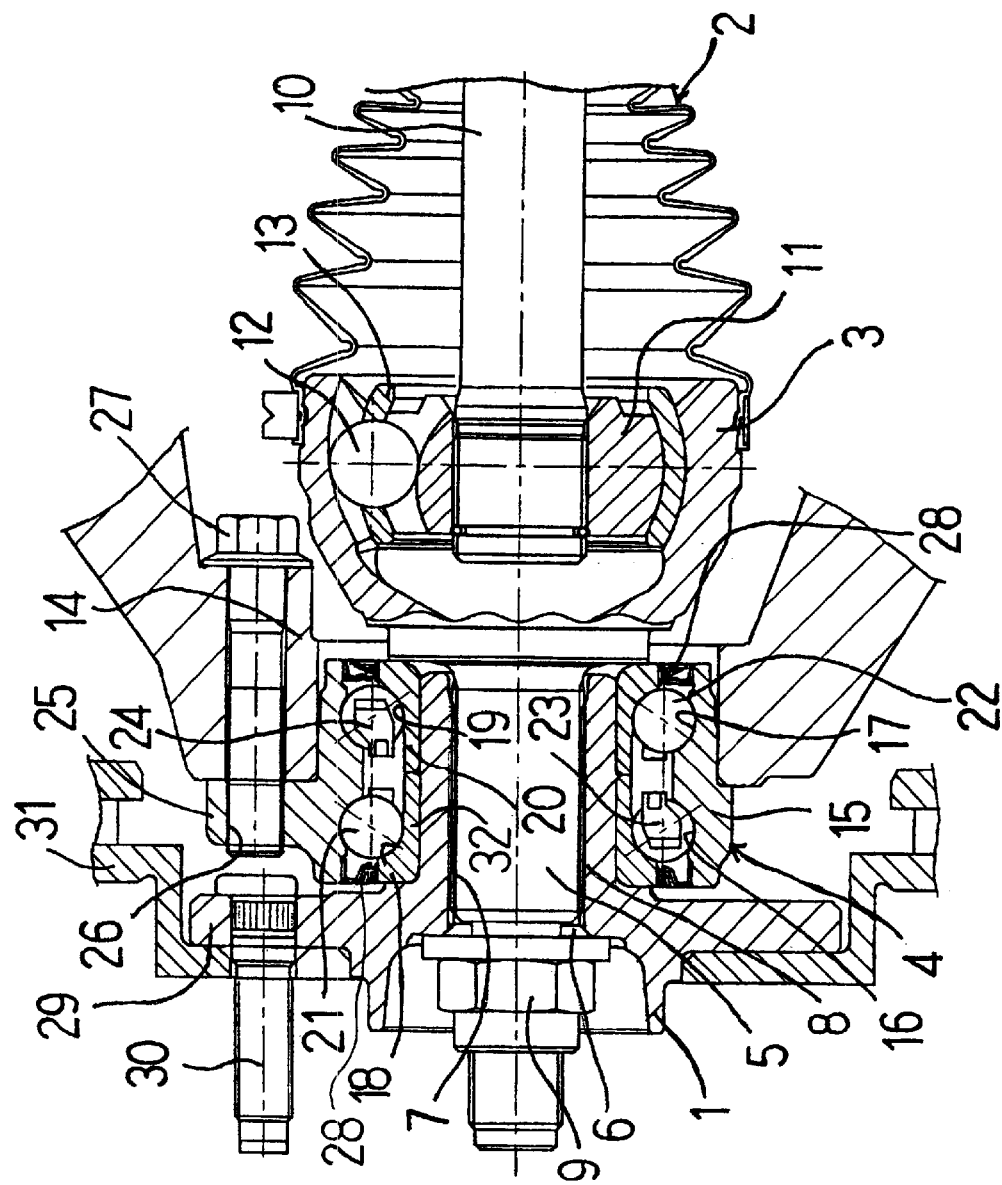
FIG. 2 is a sectional view illustrating the wheel bearing unit of a second embodiment of the present invention.
Figure 3:
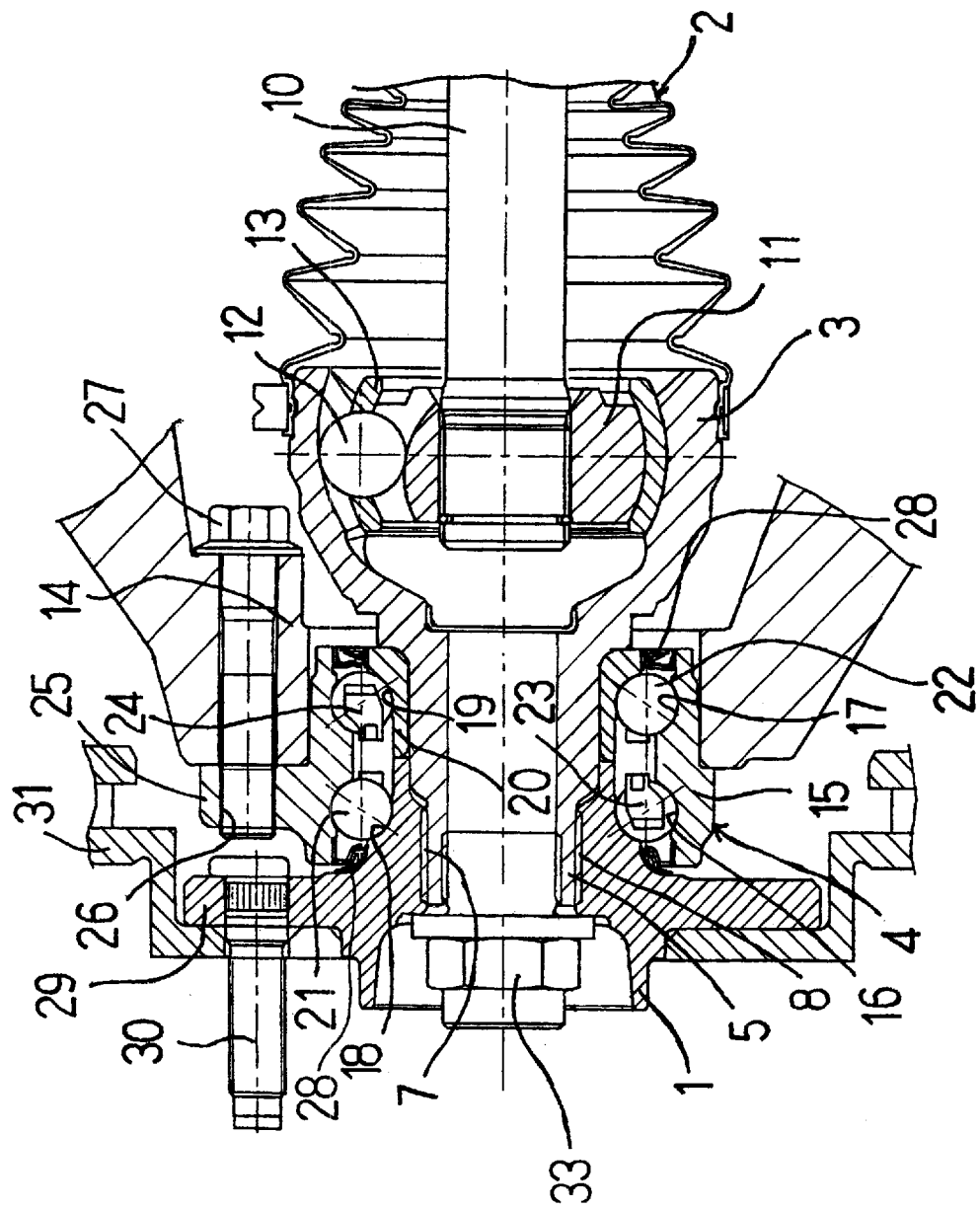
FIG. 3 is a sectional view illustrating the wheel bearing unit of a third embodiment of the present invention.
Figure 4:
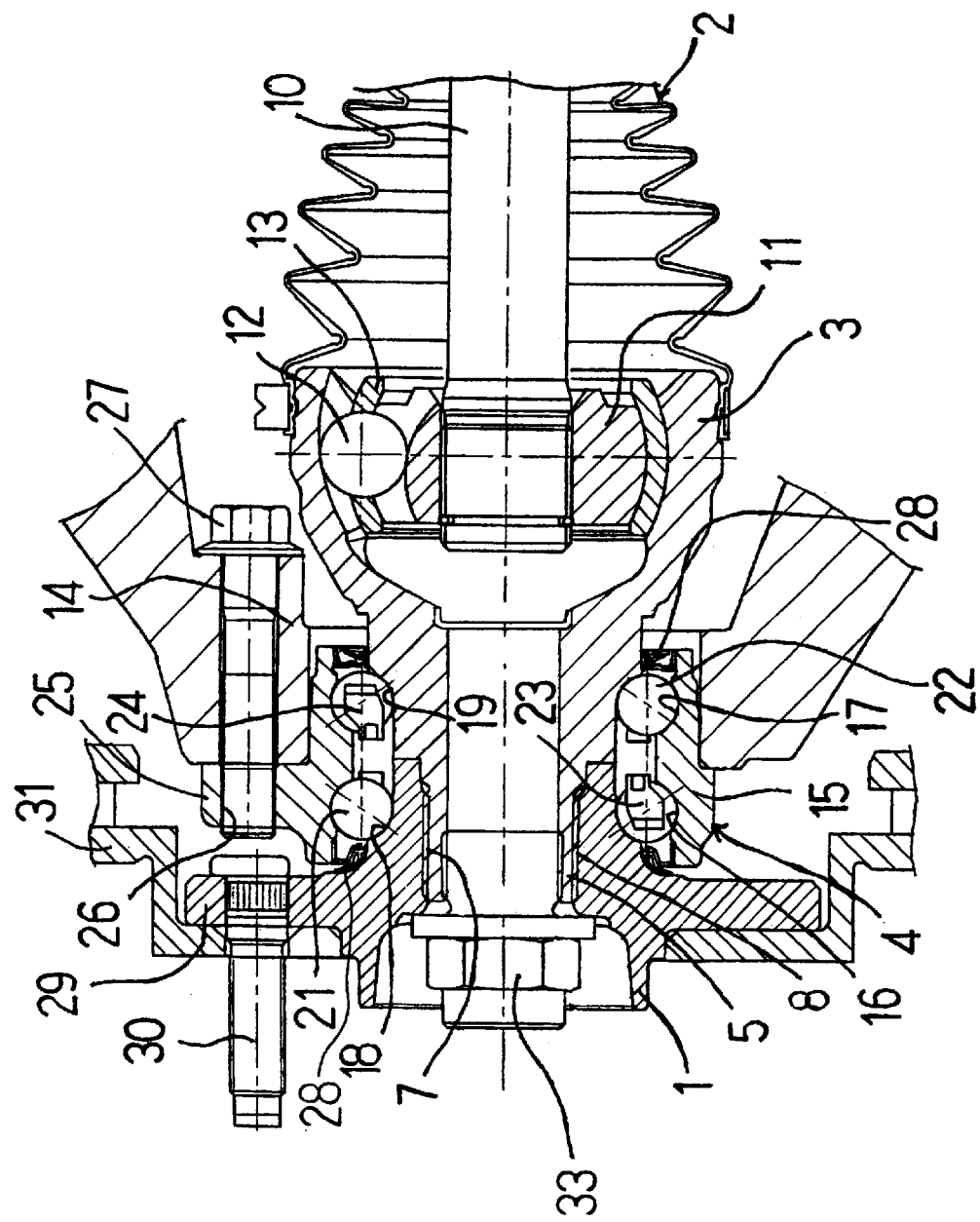
FIG. 4 is a sectional view illustrating the wheel bearing unit of a fourth embodiment of the present invention.

Hereinafter, embodiments of the present invention will be described with reference to FIGS. 1 to 4. The following embodiments shown in FIGS. 2 to 4 are so designed as to be applicable to the so-called third generation wheel bearing unit shown in FIG. 1. Thus, in FIGS. 2 to 4, those components which are shown also in FIG. 1 are identified with the same reference numerals.

Figure 1:
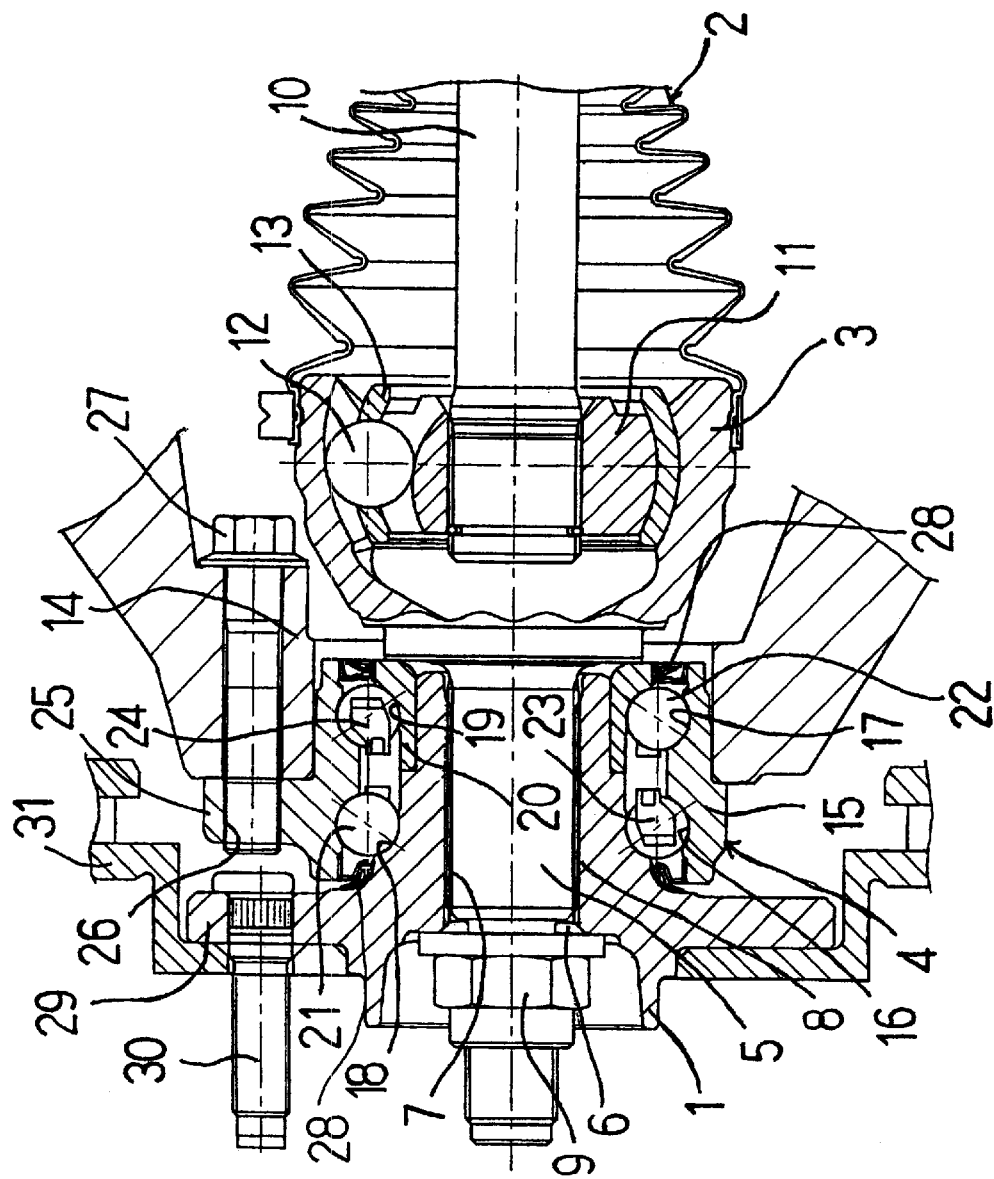
FIG. 1 is a sectional view illustrating the wheel bearing unit of a first embodiment of the present invention and a conventional wheel bearing unit.

The wheel bearing unit of the first embodiment of the present invention shown in FIG. 1 is designed for use with a driving wheel of a motor vehicle. This bearing unit is composed of a hub wheel 1, an outer joint member 3 of a constant velocity universal joint 2, and an axle bearing 4 that are assembled into a unit. Note that the outer joint member 3 of the constant velocity universal joint 2 is, with an axially extending stem portion 5 inserted through a through hole 6 of the hub wheel 1 and serrations 7 and 8 formed in the outer circumference of the stem portion 5 and the inner circumference of the through hole 6, respectively, coupled to the hub wheel 1 and secured with a nut 9 so as to achieve torque transmission therebetween.

The constant velocity universal joint 2 is composed of, in addition to the outer joint member 3, an inner joint member 11 attached to the edge of a shaft 10, a plurality of torque transmission balls 12 incorporated into the track grooves of the inner and outer joint members 11 and 3, and a retainer 13 interposed between the outer spherical surface of the inner joint member 11 and the inner spherical surface of the outer joint member 3 for retaining the torque transmission balls 12.

In the wheel bearing unit, the hub wheel 1 is rotatably supported on the axle bearing 4. A vehicle wheel (not shown) is fixedly attached to the hub wheel 1, and the axle bearing 4 is supported through a knuckle 14 acting as a mounting member on a suspension system (not shown) of the body of a motor vehicle. The hub wheel 1 is provided with a wheel mounting flange 29. The flange 29 has, at circumferentially equi-spaced positions in its surface, a hub bolt 30 for fixing a vehicle wheel. Moreover, a brake rotor 31 is fixedly attached to the flange 29 of the hub wheel 1 with the hub bolt 30.

The axle bearing 4 employs a double row angular ball bearing structure. In this construction, an outer ring 15 acting as a fixed member has double rows of raceway surfaces 16 and 17 formed in its inner diameter surface. One raceway surfaces 18 is formed in the outer circumferential surface of the hub wheel 1, and the other 19 is formed in the outer circumferential surface of an inner ring 20 that is press-fitted to the outer circumference of the smaller end face of the hub wheel 1. The raceway surfaces 18 and 19 are opposite to the raceway surfaces 16 and 17 of the outer ring 15, respectively. Between the raceway surfaces of the outer ring 15, and the hub wheel 1, the inner ring 20 are interposed double rows of rolling elements 21 and 22. The rolling elements 21 and 22 are held at circumferentially equi-spaced positions in the retainers 24 and 23, respectively. The hub wheel 1 and the inner ring 20 constitute a rotary member. Note that the axle bearing 4 is provided with a seal 28, for preventing accidental intrusion of foreign materials from outside or leak of grease contained inside.

The wheel bearing unit of the first embodiment is of the so-called third generation structure in which one raceway surface 19 (the inboard raceway surface) of the double rows of raceway surfaces 18 and 19 is formed in the inner ring 20 that is provided separately from the hub wheel 1. It should be noted that the wheel bearing unit of the present invention is not limited to this construction, but is applicable also to the construction shown in FIG. 2. The second embodiment shown in FIG. 2 is the so-called second generation bearing unit in which the other raceway surface 18 (the outboard raceway surface) is also formed in an inner ring 32 that is provided separately from the hub wheel 1.

Note that, although the first and second embodiments described above deal only with cases where the hub wheel 1 and the outer joint member 3 of the constant velocity universal joint 2 are coupled together with the nut 9, it is also possible to adopt, for example, a construction in which the two components are coupled together in such a way that the edge of the stem portion 5 protruding from the edge of the hub wheel 1 is plastically deformed by caulking.

Moreover, in the first embodiment, the inner ring 20 is press-fitted to the outer circumference of the smaller end face of the hub wheel 1. This structure is applicable to the construction shown in FIG. 3. The wheel bearing unit of the third embodiment shown in FIG. 3 is so designed that the hub wheel 1 and the inner ring 20 provided separately therefrom are press-fitted to the outer circumference of the base of the stem portion 5 of the outer joint member 3 of the constant velocity universal joint 2. The stem portion 5 has a hollow structure. By the serrations 7 and 8 that are formed in the edge of the stem portion 5 and the hub wheel 1, respectively, the outer joint member 3 is coupled to the hub wheel 1 and secured with a bolt 33 so as to achieve torque transmission therebetween.

The above-described construction is also applicable to the so-called fourth generation wheel bearing unit shown in FIG. 4. The wheel bearing unit of the fourth embodiment shown in FIG. 4 is so designed that the outboard raceway surface 18 is formed in the outer circumferential surface of the hub wheel 1, and the inboard raceway surface 19 is formed in the outer circumferential surface of the outer joint member 3 of the constant velocity universal joint 2.

Note that, although the third and fourth embodiments described above deal only with cases where the hub wheel 1 and the outer joint member 3 of the constant velocity universal joint 2 are coupled together with the bolt 33, it is also possible to adopt, for example, a construction in which the two components are coupled together in such a way that the edge of the stem portion 5 is plastically deformed by caulking so as to have its diameter expanded from inside to outside in the radial direction.

Note that the present invention is applicable not only to a construction for rotatably supporting a driving wheel on the car body, but also to a construction for rotatably supporting a driven wheel on the car body.

In any of these embodiments, the constituent members of the wheel bearing unit, i.e., the hub wheel 1 and the outer ring 15 (for the first embodiment); the inner rings 20 and 32 and the outer ring 15 (for the second embodiment); the hub wheel 1, the inner ring 20, and the outer ring 15 (for the third embodiment); and the hub wheel 1, the outer joint member 3 of the constant velocity universal joint 2, and the outer wheel 15 (for the fourth embodiment) are each made of a carbon steel containing 0.60 to 0.80 wt % of carbon. Moreover, in the predetermined area thereof, i.e., in the inboard and outboard raceway surfaces are formed surface hardened layers by a high-frequency quenching technique. Note that it is possible to employ conventional S53C steel (a medium carbon steel) only for the outer ring 15.

By forming the above-described constituent members from a carbon steel containing 0.60 to 0.80 wt % of carbon, it is possible to obtain satisfactory processability (forgeability). This is because the amount of carbon contained in this steel is smaller than that contained in the SUJ2 steel defined as a high carbon chromium bearing steel in JIS G 4805 (C: 0.95 to 1.10 wt %). Moreover, by forming a surface hardened layer in the predetermined area by a high-frequency quenching technique, it is possible to suppress degradation of the hardness of the steel material and thus secure sufficiently long rolling fatigue life. Carbon needs to be contained in the steel in the amount of 0.60 wt % or more in order to improve the structural strength, wear resistance, and rolling fatigue life. However, the C content exceeding 0.80 wt % causes the processability, machinability, and toughness to be deteriorated. For this reason, the upper limit of C content in the steel is set at 0.80 wt %.

The constituent members are made of steel containing: C: 0.70 to 0.80 wt % (exclusive of 0.80), Si: 0.50 to 1.0 wt %, Mn: 0.10 to 2.0 wt %, Cr: 0.40 to 0.95 wt %, Al: 0.050 wt % or less, 0: 0.0030 wt % or less, and the remainder being Fe and inevitable impurities. The use of such a steel material helps achieve further improvement of the processability and rolling fatigue life.

In the constituent members, carbon is an element necessary to further improve the structural strength, wear resistance, and rolling fatigue life. Carbon needs to be contained in the amount of 0.70 wt % or more in order to obtain such effects. However, the C content exceeding 0.80 wt % causes, as described above, the processability, machinability, and toughness to be deteriorated. For this reason, the upper limit of C content in the steel is set at 0.80 wt %.

Silicon is an element necessary to obtain deoxidation effect and to improve the rolling fatigue life. The Si content of less than 0.50 wt % does not sufficiently provide the effects. By contrast, the Si content exceeding 1.0 wt % causes the machinability and processability to be significantly deteriorated. For this reason, the upper limit of the Si content in the steel is set at 1.0 wt %.

Manganese is an element necessary to improve the hardenability and thus toughness of steel and is effective for improving the rolling fatigue life. However, when the Mn content is present in the amount of less than 0.10 wt %, the addition does not provide better effects. By contrast, when the Mn content is added in the amount exceeding 2.0 wt %, the machinability, toughness, and processability are significantly deteriorated. Therefore, the Mn content should be suitably in the range of 0.10 to 2.0 wt %, more preferably, 0.50 to 1.20 wt %.

Chromium is an element effective for enhancing hardenability of steel and thus for improving the structural strength and toughness. The Cr content of less than 0.40 wt % does not sufficiently provide the effects. By contrast, the Cr content exceeding 0.95 wt %, depending on the relationship with other elements, makes it impossible to omit diffusion annealing processing. Note that Cromium of about 0.80 wt % saturates the effects, and the Cr content of 0.80 wt % or more tends to cause, depending on the relationship with other elements, in particular, the C and Si content, a huge carbide to be generated during a melting process. For this reason, the Cr content should be suitably in the range of 0.40 to 0.95 wt %, more preferably, 0.40 to 0.80 wt %.

Aluminum is an element to be added to steel as a deoxidant. Al forms a hard oxide inclusion when combined with oxygen. This degrades the rolling fatigue life. Therefore, it is preferable that the Al content be reduced to a minimum, and its upper limit is set at 0.050 wt %. Moreover, Oxygen forms a hard non-metallic oxide inclusion when combined with Aluminum. This degrades the rolling fatigue life. Therefore, it is preferable that the 0 content be reduced to a minimum, and its upper limit is set at 0.0030 wt %.

Incidentally, of the double rows of raceway surfaces, the inboard raceway surface tends to suffer from a comparatively short service life. In view of this fact, the separately provided inner ring 20 in which the inboard raceway surface 19 is formed is made of a steel material having the composition described below, and is subjected to a predetermined heating treatment. This makes it possible to achieve further improvement of the rolling fatigue life.

Firstly, the separately provided inner ring 20 in which the inboard raceway surface 19 is formed is formed from an alloyed steel containing: C: 0.8 to 1.2 wt %, Si: 0.4 to 1.0 wt %, Cr: 0.2 to 1.2 wt %, and Mn: 0.8 to 1.5 wt %. The inner ring 20 is, after undergoing carbonitriding treatment, quenched at temperatures in the range of 830 to 870° C., and subsequently tempered at temperatures in the range of 160 to 190° C., with the residual austenite content in the surface layer part being 25 to 50 vol. %.

The purpose of forming the inner ring 20 from a high carbon steel containing 0.8 to 1.2 wt % of carbon is principally to harden the surface layer part by performing quenching and tempering. The reason why the Cr content is kept in the range of 0.2 to 1.2 wt % is as follows. When Cr is present in the amount of less than 0.2 wt %, no carbide is formed and thus the hardness of the surface layer becomes deficient. By contrast, when Cr is present in the amount exceeding 1.2 wt %, the carbide becomes unduly large, which results in a peeling-off start point. This tends to cause the service life to be shortened.

Silicon needs to be present in the amount of 0.4 wt % or more to increase the residual austenite content in the surface layer to 25 vol. % or more with stability, to obtain tempering softening resistance, and to secure sufficient heat resistance. However, the Si content exceeding 1.0 wt % inhibits enrichment of nitrogen and carbon in the area ranging from the surface zone to the surface layer part during carbonitriding treatment.

In General, Manganese is an element necessary to secure sufficient hardenability so that steel is hardened to the core. Meanwhile, in this embodiment, Manganese is added as an element for stabilizing the residual austenite during quenching and tempering. The addition increases the residual austenite content in the surface layer part. However, the addition of Manganese in an unduly large amount inconveniently causes poor processability, quenching crack, and embrittlement. Therefore, the Mn content should be added in the amount of no greater than 1.5 wt %.

In the inner ring 20 made of an alloyed steel having such a composition as described above, after carbonitriding treatment is performed, nitrogen is contained in a larger amount in the surface layer part thereof, and the Ms point for the surface layer part becomes lower than that for the core part. Then, the surface layer part is quenched, with the result that the surface layer part contains a larger amount of untransformed austenite than the core part. Since a larger amount of nitrogen is contained in the surface layer part, and the quenching start temperature (austenitizing temperature) is raised so as to fall in the range of 830 to 870° C., it is possible to increase the residual austenite content in the surface layer part to 25 vol. % or more with ease. To increase the residual austenite content with stability, the quenching termination temperature needs to be set at about 100° C., more preferably, in the range of 90 to 120° C. During the quenching process, martensitic transformation in the surface layer part enriched with nitrogen lags behind that in the inner part, and the martensite content in the surface layer part is smaller than in the inner part. Therefore, residual compression stress is applied to the surface layer part.

Here, as compared with normal quenched and tempered steel, the quenching start temperature (austenitizing temperature) is as high as 830 to 870° C. This leads to an increase in the value of crack sensitivity in the quenching process. Accordingly, the cooling power in the range of 300 to 150° C. in the quenching process is set suitably at 0.2 cm$^{-1}$ or less, whereby the cooling rate observed during the martensitic transformation process is controlled properly.

Carbonitriding treatment is usually carried out in such a way that steel is carbonitrided in high-temperature gas that contains carburizing or reducing gas and additionally ammonia. Meanwhile, in the embodiment, the steel is carbonitrided at temperatures in the range of 830 to 870° C., and is immediately thereafter quenched in oil under the conditions described just above.

In the heating treatment method employed in the embodiment, after quenching, tempering is performed at relatively low temperatures in the range of 160 to 190° C. so as to suppress decomposition of the residual austenite observed during the tempering process. In this way, the residual austenite content in the surface layer part is kept in the range of 25 to 50 vol. %. Within this range, the larger the residual austenite content is, the more the rolling fatigue life is improved under lubrication with entrainment of foreign substances. In this case, however, the surface hardness is reduced, and this leads to poor wear resistance. For this reason, it is preferable that the residual austenite content in the surface layer part be kept in the range of 25 to 30 vol. %. By contrast, the core part is tempered at a temperature as low as 190° C. or below, and thus the residual austenite remains thereon in the amount of about 15 to 20 vol. %.

Secondly, the inboard raceway surface 19 is formed in the separately provided inner ring 20 that is made of a carburized steel containing 0.15 to 0.40 wt % of carbon. The raceway surface 19 is composed of a surface hardened layer that contains carbon in the amount of 0.8 wt % or more and has Rockwell hardness of HRC 58 or more, and a core part having Rockwell hardness of HRC 48 or more and below HRC 58. In the aforesaid surface hardened layer, the residual austenite is present in the amount of 25 to 35 vol. %, the grain size of the residual austenite is kept at 5 μm or less, and residual carbide content is kept at 10% by area or less.

As a preferable steel material, a cleaned steel is employed such as a carbon steel for structural use containing 0.15 to 0.40 wt % of carbon, or a low alloy steel for structural use (for example, SCr430 steel defined in JIS G 4104, or SCM430 steel defined in JIS G 4105). After being formed into the inner ring 20, the steel is subjected to carbonitriding treatment so as to contain carbon in the amount of 0.80 wt % or more. Then, it is quenched and tempered in a manner as described later so as to form a carburized layer that has the above-described surface hardened layer characteristics.

By performing quenching and tempering subsequently to the carbonitriding treatment, the surface hardened layer is so controlled that residual austenite is present in the amount of 25 to 35 vol. %, the grain size of the residual austenite is kept at 5 μm or less, and residual carbide content is kept at 10% by area or less. Then, it is super-finished so as to eventually form a raceway surface.

The surface hardened layer is composed of two phases—tempered martensitic phase and residual austenite phase, and includes residual carbide. The residual austenite content is represented by vol. %. The purpose of keeping the residual austenite content in the range of 25 to 35 vol. % is to impart toughness to the high hardness surface hardened layer. This allows relaxation of stress induced by plastic deformation due to the surface indentation made by the solid foreign substance entrained in the lubricant oil. The residual austenite content of less than 25 vol. % is insufficient for relaxation of stress induced by plastic deformation. By contrast, the residual austenite content exceeding 35 vol. % causes an unduly great plastic deformation, resulting in degradation of the surface roughness.

The grain size of the residual austenite is represented by the diameter of a circle having an area equal to the area of a single grain of austenite existing in the polished and etched surface of a steel sample, as observed under a microscope. The grain size needs to be set at 5 μm or less for the following reason. To cope with entrainment of minute foreign substances, a sufficient number of residual austenite phases are secured in the impressions made by the foreign substances. This makes it possible to relax the stress induced by the indentation made by the foreign substances and thus prevent cracks from being generated from the surface layer.

Moreover, the residual carbide referred,to in this case principally means the following: During quenching heating treatment, part of the carbide remains unmelted in the austenite phase. The remaining carbide obtained after quenching is called residual carbide. The residual carbide content is represented by the occupied sectional area (%) of a sample steel, as observed under a microscope. The residual carbide content is set at 10% by area or less. Because, by doing so, it is possible to increase the amount of solid solution carbon contained in the tempered martensitic phase and thereby increase the matrix strength. This helps alleviate the adverse effect of compressive stress that is applied to the internal portion of the surface layer due to indentation made by the foreign substance, and simultaneously imparts tempering resistance to the matrix. This helps prevent the hardened layer from being softened due to temperature rise during operation. As a result, sufficiently long rolling fatigue life can be secured even under harsh working conditions.

The above-described structure of the surface hardened layer is realized by performing heating treatment subsequently to carbonitriding treatment. In order for the carburized layer to contain carbon in the amount of 0.8 wt % or more, carbonitriding treatment is performed for a predetermined period of time, with the carbon potential in carburization atmosphere kept at 0.8 wt % or more. In the carbonitriding process, the layer is, after undergoing heat treatment in the carburization atmosphere (and diffusion treatment, as is usual), hardened by oil cooling (carburizing quenching), and is then subjected to secondary quenching and tempering. The secondary quenching is performed at temperatures in the range of 820 to 870° C., and subsequently the tempering at a temperature of 250° C. or below, more preferably, 200° C. or below.

To facilitate stabilization of the residual austenite generated during the martensitic transformation process in the secondary hardening, it is necessary to take the chemical composition of a steel material into consideration, to provide carbon and nitrogen in the carburized layer, the addition of which can be done in the heating treatment process, and to adopt austenitizing temperature as a preferable processing temperature. On the other hand, the carbide obtained as the result of the martensitic transformation is mainly cementite that remains unmelted during processing at the austenitizing temperature. Therefore, the carbide content is basically determined in accordance with the excess of carbon exceeding the carbon content in the Acm line at the austenitizing temperature, as seen in the Fe—$Fe_3C$ phase diagram. With regard to other elements, Nitrogen reduces the carbide.

In the carburized layer in which the C content is kept in the range of 0.8 to 1.0 wt %, by controlling the secondary quenching temperature so that it falls in the range of 820 to 870° C., and performing tempering at a temperature of 200° C. or below, it is possible to keep the residual austenite content in the range of 25 to 35 vol. %, and to obtain the residual austenite having a grain size of 5 μm or less. The higher the secondary quenching temperature is, the more satisfactorily the austenite can be stabilized. Therefore, the secondary quenching temperature exceeding 870° C. increases the residual austenite content, as well as the grain size of the residual austenite. By contrast, the secondary quenching temperature of 820 ° C. or less reduces the residual austenite content to 25 vol. % or less.

The surface hardened layer can be also realized by performing carbonitriding treatment on the carburized layer. In this case, the layer is, after undergoing carburizing quenching, subjected to carbonitriding treatment instead of the above-described secondary quenching, and is immediately thereafter quenched. An increase in nitrogen contained in the carburized layer leads to an increase in the amount of solid solution carbon. As a result, the amount of residual carbide is decreased, but simultaneously the austenite is stabilized. Thus, the quenching, which is performed immediately after the carbonitriding treatment, is performed at low temperatures in the range of 800 to 840° C. In this way, the grain size and amount of the residual austenite obtained after the quenching are kept within the above-described predetermined range. As will be understood from the foregoing, even if the austenitizing temperature is lowered so that it falls in the range of 800 to 840° C., an increase in nitrogen contained in the carburized layer leads to an increase in the amount of solid solution carbon contained in the austenite, and thereby the residual carbide content is reduced. Thus, it is possible to reduce the residual carbide content to 10% by area or less. Note that, as a method for controlling the amount of residual austenite, it is also possible to adopt subzero treatment or high-temperature tempering treatment.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A wheel bearing unit for rotatably supporting a car wheel on a body of a motor vehicle, comprising:

a rotary member to which a car wheel is attached, the rotary member having double rows of raceway surfaces;

a fixed member fixedly coupled to a mounting member located on a car-body side of the device, the fixed member having double rows of raceway surfaces formed therein so as to be opposite to the raceway surfaces of the rotary member; and double rows of rolling elements interposed between the raceway surfaces of the rotary and fixed members, respectively, wherein at least the rotary member is made of a carbon steel containing 0.60 to 0.80 wt % of carbon, and, in the double rows of raceway surfaces of the rotary member, a surface hardened layer is formed by a high-frequency quenching technique.

2. A wheel bearing unit according to claim 1, wherein the rotary member is made of steel containing: C: 0.70 to 0.80 wt % (exclusive of 0.80), Si: 0.50 to 1.0 wt %, Mn: 0.10 to 2.0 wt %, Cr: 0.40 to 0.95 wt %, Al: 0.050 wt % or less, 0: 0.0030 wt % or less, and the remainder being Fe and inevitable impurities.

3. A wheel bearing unit according to claim 1 or 2, wherein, of the double rows of raceway surfaces of the rotary member, an inboard raceway surface is formed in an inner ring that is separately provided, the inner ring being formed from an alloyed steel containing: C: 0.8 to 1.2wt %, Si: 0.4 to 1.0 wt %, Cr: 0.2 to 1.2wt %, and Mn: 0.8 to 1.5 wt %, and the inner ring being, after undergoing carbonitriding treatment, quenched at temperatures in the range of 830 to 870° C., and subsequently tempered at temperatures in the range of 160 to 190° C., with a residual austenite content in a surface layer part being 25 to 50 vol. %.

4. A wheel bearing unit according to claim 1 or 2, wherein, of the double rows of raceway surfaces of the rotary member, an inboard raceway surface is formed in a separately provided inner ring formed from a carburized steel containing 0.15 to 0.40 wt % of carbon, wherein the raceway surface is composed of a surface hardened layer that contains carbon in an amount of 0.8 wt % or more and has Rockwell hardness of HRC 58 or more, and a core portion having Rockwell hardness of HRC 48 or more and below HRC 58, and wherein, in the surface hardened layer, a residual austenite content is kept in a range of 25 to 35 vol. %, a grain size of the residual austenite is set at 5 μm or less, and a residual carbide content is kept at 10% by area or less.

* * * * *